Oct. 11, 1927.
A. MOORE
1,645,340
REMOVABLE LOCKING DENTAL BRIDGEWORK
Filed July 2, 1923    2 Sheets-Sheet 1
Fig. 1
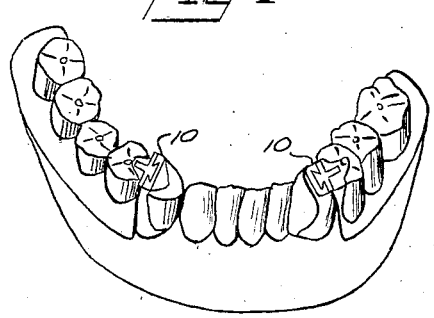
Fig. 2
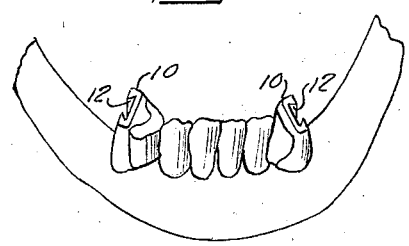
Fig. 3
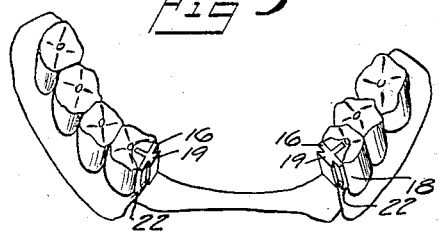
Fig. 4
Fig. 5
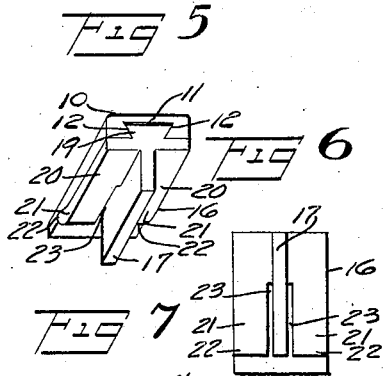
Fig. 6
Fig. 7
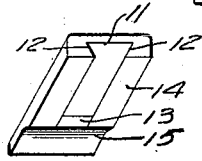
Fig. 8
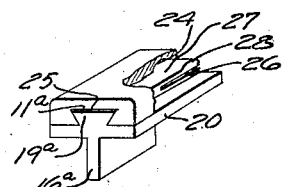
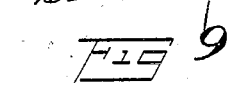
Fig. 9
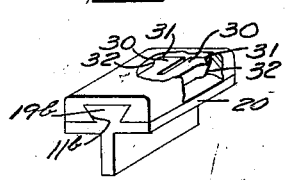
INVENTOR
Arlington Moore
BY
H. H. Dyke
ATTORNEY Oct. 11, 1927.
A. MOORE
1,645,340
REMOVABLE LOCKING DENTAL BRIDGEWORK
Filed July 2, 1923    2 Sheets-Sheet 2
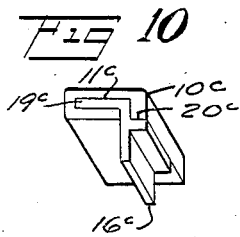
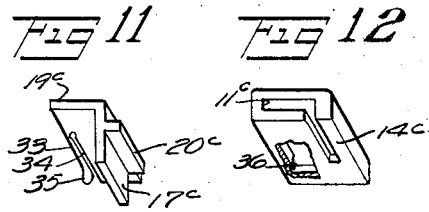
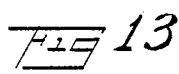
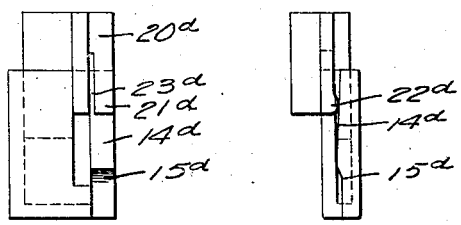
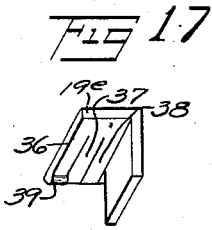
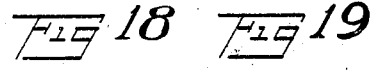
INVENTOR
Arlington Moore
BY H. H. Dyke
ATTORNEY Patented Oct. 11, 1927.

1,645,340

UNITED STATES PATENT OFFICE.

ARLINGTON MOORE, OF WORCESTER, MASSACHUSETTS, ASSIGNOR TO MOORE INVENTIONS CORPORATION, OF WORCESTER, MASSACHUSETTS, A CORPORATION OF MASSACHUSETTS.

REMOVABLE LOCKING DENTAL BRIDGEWORK.

Application filed July 2, 1923. Serial No. 649,038.

The object of the present invention is the provision of removable dental bridgework which is adapted to be locked in place.

With bridgework embodying my invention the bridge is automatically locked when put into place and cannot come out of place until purposely removed. According to the preferred form of the invention the socket member which is inset in or attached to a natural tooth is so constructed as to be practically self-cleaning, or at least can be readily cleaned out by the wearer should food or other particles become lodged therein, as, for example, as a result of eating with the bridge removed from the mouth.

According to certain forms of the invention the engagement of locking faces which produces the locking action is made in a region outside of the socket in the female locking member, and such arrangement is preferred, but the principle of the invention may be applied also to secure a locking engagement with the socket member. The invention also includes novel forms of connecting means between the socketed anchor member and the holding member secured to the false bridge portion.

In the accompanying drawings I show certain embodiments of the invention, but it is to be understood that same are only for illustration and are not to be interpreted as imposing limitations.

In said drawings, Fig. 1 is a perspective view of lower jaw bridgework in place. Fig. 2 is a view of the anchorage portion of the bridgework of Fig. 1. Fig. 3 is a view of the bridge removed. Fig. 4 is a plan view of a double ended bridge with the same locking device as in Figs. 1-3. Fig. 5 is a perspective view of the anchor and insert of Figs. 1-4 assembled and locked together. Fig. 6 is a front view of the parts shown in Fig. 5. Fig. 7 is a perspective view of the anchor or female portion alone. Fig. 8 is a perspective view with parts broken away of a modified form in which the locking takes place within the socket. Fig. 9 is a similar view of a further modified form having the locking action within the socket. Figs. 10, 11 and 12 are perspective views showing a further modification; Fig. 10 showing the locking assembly of male and female parts, and Fig. 11 showing the male part, and Fig. 12 the female part respectively. Fig. 13 is a perspective view of a further modification, the parts being in locked relation. Figs. 14 and 15 are respectively front and side views of the parts shown in Fig. 13 when part way put together. Figs. 16-19 show a further modification; Fig. 16 being a perspective view of the parts locked together, Fig. 17 a perspective view of the male part, Fig. 18 a part perspective part sectional view of the female or anchor member, and Fig. 19 a bottom plan view of the male member. Figs. 20 and 21 are perspective views with parts broken away of still further modifications, the parts being shown locked together in each of these views.

Referring to Figs. 1-7, reference numeral 10 designates an anchor part adapted to be secured in or attached to a natural tooth. The anchor part 10 is provided with a dovetail recess 11 having undercut walls 12, 12. The bottom 13 of dovetail recess 11 is preferably square as shown in Fig. 7, and recess 11 can be readily cleaned out when the bridge is removed, as will be clearly seen from this view. This is a feature of great convenience in use. The face 14 of anchor portion 10 containing the dovetail recess 11 is provided with a locking recess or recesses 15 which, as will be seen, are entirely outside the socket recess 11. Such locking recess cooperates with locking tongues on the male member, attached to the bridge.

The male member 16 has a web 17 or equivalent means for securing it to the saddle or other false tooth structure 18, and has a dovetail tongue portion 19 adapted to enter and engage the dovetail recess 11. The part 19 is supported on the bottom part 13 of recess 11 which takes the strain produced by biting with the teeth of bridge 18. Said male member 16 is also provided with means to engage face 14 of female member 10, and in the form shown, is provided with laterally extending portions 20, 20, which are provided with downwardly extending tongues 21, 21, having preferably rounded or knob-like ends 22, 22, adapted to enter and lock in the locking recess 15 in the face 14 of female member 10. Tongues 21, 21, being separated from web 17 by slots 23, 23, may be adjusted by bending to secure the requisite locking action, which should be sufficiently secure to keep the false structure in its place during use and yet not so tight as to require an unduly great manual pull for its removal. It will be seen that in the form just described the locking surfaces are located outside the socket or anchor recess, yet at the same time the dovetail connection between the female anchor and the male insert serves to hold the locking parts together and to keep them in locking relation. One great advantage of such construction in addition to those already referred to lies in the fact that the dovetail recess 11 may be quite narrow and all the parts may be made of relatively small dimension without undue sacrifice of holding power.

In the form of Fig. 8, the locking recess or groove 24 is formed within the inner face 25 of dovetail recess $11^a$, and the dovetail insert portion $19^a$ of the male member $16^a$ is split by the transverse slot 26, leaving a rear spring tongue portion 27, which is provided with the rounded locking portion 28 adapted to make locking engagement with locking recess 24. In such case the spring tongues 21 may be dispensed with, or if desired, same may be retained to be used in conjunction with spring tongue 27.

In Fig. 9 the lower portion of insert member $19^b$ is split by slot 29 extending at right angles to slot 26 of Fig. 8, and providing side tongues 30, 30, the rounded side portions 31, 31 whereof have a spring locking engagement with locking recesses 32, 32 formed in the sidewalls of the dovetailed slot $11^b$.

In Figs. 10–12 the female member $10^c$ has an L-shaped slot $11^c$ and the inserted portion $19^c$ of male member $16^c$ has a side tongue 33 formed therein by the provision of slot 34, and tongue 33 has a locking knob 35 adapted to make locking engagement with recess 36 formed at the bottom of recess $11^c$ and at the side thereof. To secure effective holding action web $17^c$ of male member $16^c$ is provided with a lateral extension $20^c$ adapted to bear against the face $14^c$ of the female member $10^c$.

The form of Figs. 13–15 is like that of Figs. 10–12, except that the laterally extending member $20^d$ is provided with a slot $23^d$ leaving a spring portion $21^d$ the rounded rearwardly projecting knob $22^d$, whereof is adapted to make a locking engagement with locking recess $15^d$. The face $14^d$ may be formed on a taper as shown in Fig. 15, if desired, to secure a wedging action on knob $22^d$ as it is pushed into place.

In the form of Figs. 16–19 the insert portion $19^e$ is cut into a plurality of spring fingers 36, 37, 38, all or part of which have locking knobs to enter a locking recess 40 at the bottom of L-shaped slot $11^e$. In the form shown finger 36 has a forwardly projecting knob 39 and finger 38 a rearwardly projecting locking knob 41. In this way tension is put on the insert member $19^e$ in two opposite directions, securing a highly effective locking action.

The form shown in Fig. 20 comprises a T-shaped slot $11^f$ in the anchor member $10^f$ with inwardly tapering edge walls 43, 43 terminating in locking recesses 44, 44 adapted to be engaged by locking knobs 45, 45 formed on spring tongues 46, 46, which are separated from the remaining portion of the insert male member $19^f$ by slots $23^f$. In Fig. 21 the construction is like that of Fig. 20, with the exception that there is but one locking tongue $46^g$, and the slot $11^g$ and male insert member $19^g$ are L-shaped, instead of T-shaped.

Various other modifications may be resorted to, without departing from my invention, as will be apparent to those skilled in the art.

The bridgework may, of course, be of various forms. By way of example merely I have shown in Figs. 1, 2 and 3 the saddle 18 carrying the false teeth and extending back of and on both sides of natural teeth, and in Fig. 4 I have shown a two-tooth bridge $18^a$ supported between two natural teeth. Any suitable material may be used for making the interlocking parts, hard platinum or gold alloy being preferably used.

I claim:

1. In dental bridgework a socketed anchor member, a holding member adapted to be inserted in the socket of the anchor member, and interlocking means outside of the socket in the anchor member for detachably locking said members together, said means comprising a knob on the holding means adapted to engage in a face recess provided in the anchor member.

2. A socketed anchor member having a locking recess remote from the socket, a holding member having a prong to enter the socket and having an integral spring tongue provided with a knob to enter the locking recess and make detachable interlocking engagement with the anchor member.

3. An anchor member adapted for fastening in a natural tooth and having a prong receiving socket and a face recess, a holding member adapted to be secured to a removable tooth structure, a prong on the holding member adapted to enter and be held in the socket, and spring locking means on the holding member adapted to make locking engagement with said face recess in the anchor member.

In testimony whereof, I have signed my name hereto.

ARLINGTON MOORE.